United States Patent [19]

Stanley

[11] Patent Number: 4,788,452

[45] Date of Patent: Nov. 29, 1988

[54] SWITCHABLE DC POWER SUPPLY WITH INCREASED EFFICIENCY FOR USE IN LARGE WATTAGE AMPLIFIERS

[75] Inventor: Gerald R. Stanley, Mishawaka, Ind.

[73] Assignee: Crown International, Inc., Elkhart, Ind.

[21] Appl. No.: 64,744

[22] Filed: Jun. 22, 1987

[51] Int. Cl.⁴ .......... H02J 1/10

[52] U.S. Cl. .......... 307/71; 307/60; 307/66; 307/37; 322/90

[58] Field of Search .......... 307/43, 49, 50, 46, 307/48, 64, 66, 71, 85, 86, 87, 37; 322/29, 90; 363/69; 323/346; 318/93, 95

[56] References Cited

U.S. PATENT DOCUMENTS

| | | | |
|---|---|---|---|
| 3,459,957 | 8/1969 | Kelley | 307/71 |
| 3,487,229 | 12/1969 | Krausz | 307/71 |
| 3,694,731 | 9/1972 | Cherry | 363/39 X |
| 3,704,381 | 11/1972 | Nercessian | 307/60 X |
| 3,748,500 | 7/1973 | Tam | 307/71 X |
| 3,800,197 | 3/1974 | Mehta | 318/95 X |
| 3,846,695 | 11/1974 | Genuit et al. | 307/71 X |
| 3,871,383 | 3/1975 | Lee | 307/71 X |
| 3,938,031 | 2/1976 | Blackmond | 307/71 X |
| 4,009,431 | 2/1977 | Johnson | 307/71 X |
| 4,081,738 | 3/1978 | Roller | 307/71 X |
| 4,143,283 | 3/1979 | Graf et al. | 307/71 X |
| 4,175,249 | 11/1979 | Gruber | 307/66 X |
| 4,315,162 | 2/1982 | Ferguson | 307/71 X |
| 4,339,704 | 7/1982 | McSparran et al. | 322/90 |
| 4,375,593 | 3/1983 | Winterbotham | 307/37 |
| 4,412,137 | 10/1983 | Hansen et al. | 307/71 X |
| 4,456,870 | 6/1984 | Rodari | 322/29 |

*Primary Examiner*—William M. Shoop, Jr.
*Assistant Examiner*—Paul Ip
*Attorney, Agent, or Firm*—Thomas J. Dodd

[57] ABSTRACT

A switch connected between two voltage sources and responsive to a sensing circuit. The switch includes a transistor which operates to interchange the electrical connection of the two voltage sources from parallel to series upon the sensing circuit signals the need for more voltage. The two sources are normally in parallel to increase the cost efficiency and energy efficiency of the amplifier and power supply.

8 Claims, 2 Drawing Sheets

SWITCHABLE DC POWER SUPPLY WITH INCREASED EFFICIENCY FOR USE IN LARGE WATTAGE AMPLIFIERS

BACKGROUND OF THE INVENTION

This invention will relate to a means for increasing the efficiency of high wattage amplifiers and will have specific application to a means for switching power supplies in large wattage amplifiers between a series and parallel arrangement for increased efficiency.

In industry, it is very often desirable to have an amplifier capable of producing a large amount of output power, generally in the range of several kilowatts. A good example of a situation where this power output is required would be in the field of AM radio where large amplifiers are used for transmitter modulators. Another common use of such large amplifiers is an excitor for vibration or shake tables used to test products against vibration. A problem associated with such large amplifiers is the generally poor efficiency of the amplifier which increases the operating and construction cost. A generally accepted definition of efficiency is the ratio of useful power delivered by a dynamic system to the power supplied to it. Industry has made several attempts to increase the efficiency of an amplifier. The most popular, however, is the pulse width modulation technique. In pulse width modulation, the amplitude of the signal to the amplifier remains constant with the pulse width varying. The advantage of pulse width modulation is that since the signal is of a constant amplitude the transistors used can function between cut off and saturation, thereby, increasing the efficiency of the amplifier by reducing the power dissipated in the system. To increase the efficiency of the amplifier further by reducing the amount of power that must be dissipated in the form of heat, it is typical to use a center tapped DC power supply with a complementary pair of pulse width modulated switches connected between the positive and negative voltage supplies and a load which is connected to the center tap. A problem associated with this is that in order to insure the maximum sharing and efficiency between the set of pulse width modulated switches, the components within the switches must be carefully and accurately selected and matched. If one switch is not speed matched to its complementary switch then a current will be generated which will pass through both switches and the efficiency of the system will drop.

SUMMARY OF THE INVENTION

In this invention, the problems associated with previous attempts to increase amplifier efficiency are eliminated by using a power supply which has multiple DC outputs that may be switched from parallel to series in response to the output of the amplifier becoming too large as compared with voltage of one of the DC outputs of the power supply. Upon the amplifier voltage falling below the predetermined maximum, the DC outputs are switched back to parallel to improve cooling and heat dissipation of the amplifier power supply thereby making the amplifier and power supply more cost and energy efficient. An ancillary benefit of this invention is that since the power supply is more efficient a smaller wattage power supply may be used to power the amplifier thus reducing cost further.

Accordingly, it is an object of this invention to provide for an increased efficiency amplifier power supply design.

Another object of this invention is to provide a means for switching voltage sources between a series and parallel condition.

Other objects of this invention will become obvious upon a reading of the following description.

BRIEF DESCRIPTION OF THE INVENTION

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
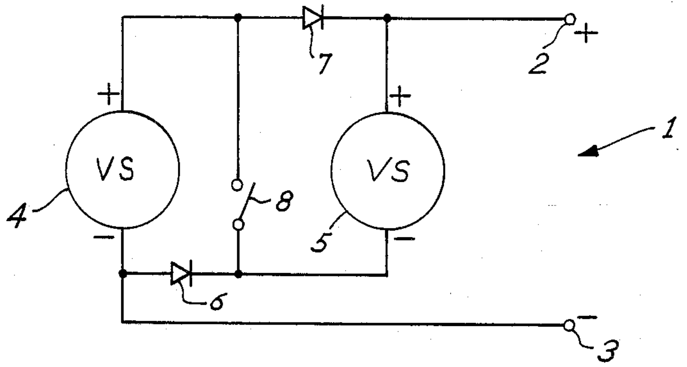
FIG. 1 is a schematic representation of the switchable power supply of this invention.

FIG. 1 depicts a switchable DC power supply circuit 1 which has DC voltage sources 4 and 5 and diodes 6 and 7 interconnected between output terminals 2 and 3. DC voltage source 4 is connected at its negative voltage terminal to negative output terminal 3 of DC power supply circuit 1. Diode 7 has its anode connected to the positive terminal of voltage source 4 and its cathode to the positive terminal of voltage source 5 and to positive output terminal 2 of DC power supply circuit 1. Diode 6 is connected at its cathode to the negative terminal of voltage source 5 and at its anode to the negative terminal of voltage source 4. An electrical or mechanical switch 8 is connected between the anode of diode 7 and the cathode of diode 6.

In use with switch 8 open DC voltage sources 4 and 5 are connected in parallel and the voltage at terminals 2 and 3 is equal to the voltage of one source 4 or 5 (assuming both are equal). When switch 8 is closed, voltage sources 4 and 5 are placed in series between terminals 2 and 3 with the positive terminal of voltage source 4 connected through switch 8 to the negative voltage terminal of voltage source 5.

Figure 2:
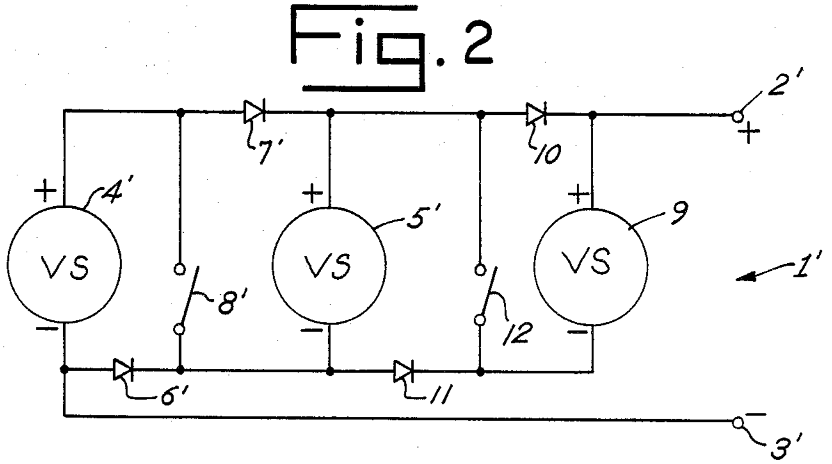
FIG. 2 is a schematic representation of a second embodiment of a switchable power supply.

As can be seen in FIG. 2 any multiple of voltage sources can be switched by adding two diodes and a switch for each additional voltage source. The circuits of FIG. 1 and FIG. 2 use a common numbering scheme with numbers primed in FIG. 2 to denote common function or purpose. In addition to components mentioned in the description of FIG. 1, the switchable power source 1' shown in FIG. 2 includes DC voltage source 9 connected in parallel with DC voltage source 5'. Diode 10 is connected between the positive voltage terminals of voltage sources 5' and 9 with its cathode connected to voltage source 9 and positive voltage output terminal 2'. Diode 11 is connected between the negative voltage terminals of voltage source 5' and 9 with its cathode connected to voltage source 9. A second electrical or mechanical switch 12 is connected between the anode of diode 10 and the cathode of diode 11.

In use, if switches 8' and 12 are open the voltage available at terminals 2' and 3' is equal to the parallel value of voltage sources 4', 5' and 9. If switch 8' is closed and 12 remains open then the voltage available at terminals 2' and 3' is equal to the parallel voltage of sources 5' and 9 in series with the voltage of source 4'. If switch 8' is open and switch 12 is closed, source 9 will be in series with the parallel combination of sources 4' and 5'. When both switches 8' and 12 are closed sources 4', 5' and 9 are in series and the voltage at terminals 2' and 3' is equal to the sources collective value.

Figure 3:
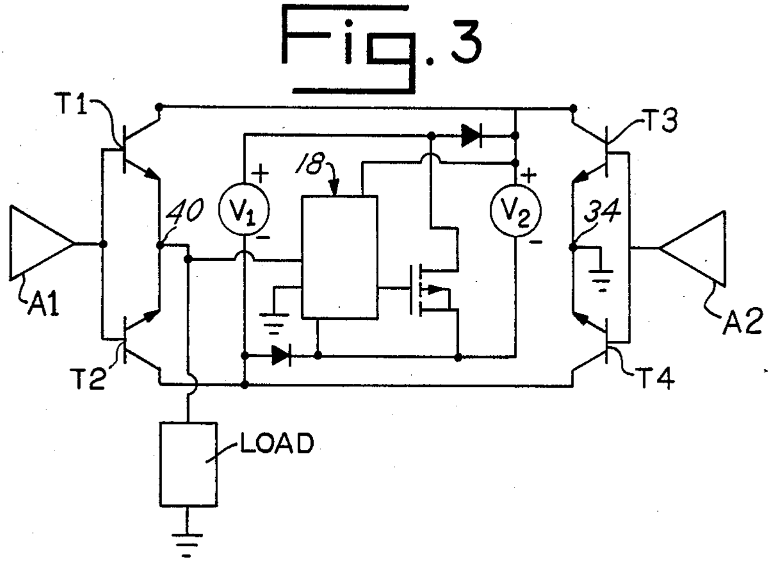
FIG. 3 is a schematic representation of the switchable power supply connected to an amplifier circuit.

An amplifier shown in block form in FIG. 3 includes two amplifiers A1 and A2 driving four transistors T1–T4 which are connected in a bridge configuration having output terminals 40 and 34 connected to a load. The amplifier circuit depicted is known in industry and is included merely to illustrate the interconnection of the switching circuit 18 (described below) and amplifier circuitry. As such the amplifier does not constitute a point of novelty of this invention.

Figure 4:
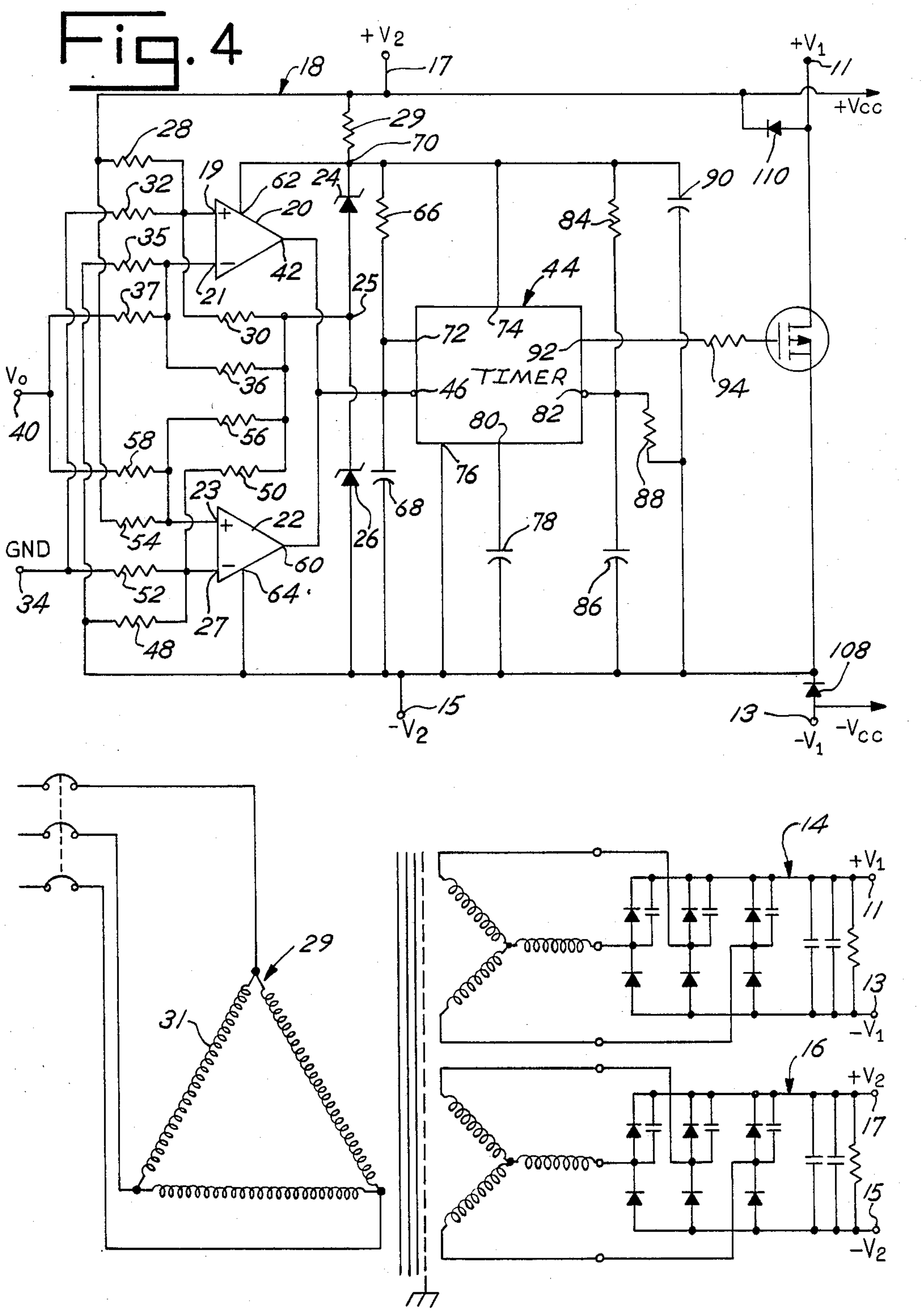
FIG. 4 is a schematic representation of a further embodiment of the switchable power supply having a comparator and triggering circuits.

FIG. 4 illustrates an application of the previous switchable power supply 1 where switch 8 of FIG. 1 is replaced by switching circuit 18. Transformer 29 having primary windings 31 connected to a three phase external power source not shown also includes secondary windings which have filtering and rectifying devices to form DC power supplies 14 and 16. DC supply 16 is connected to a switching circuit 18 to provide supply and reference voltages to the components of circuit 18. Switching circuit 18 includes as main components comparators 20 and 22. Zener diodes 24 and 26 are connected in series along with current limiting resistor 29 between the positive voltage terminal 17 and negative voltage terminal 15 of DC supply 16 to provide a set point for comparators 20 and 22. A voltage divider is provided by connecting resistors 28 and 30 in series between positive terminal 17 and junction 25 of zener diodes 24 and 26. The junction of resistors 28 and 30 is connected to non-inverting input terminal 19 of comparator 20 to provide a reference voltage at terminal 19. Resistor 32 is connected between terminal 19 of comparator 20 and the ground 34 of an amplifier circuit (shown in FIG. 3). Resistor 35 and 36 are connected in series between junction 25 and negative voltage terminal 15 to form a voltage divider with the junction of resistors 35 and 36 being connected to inverting input terminal 21 of comparator 20. Resistor 37 is connected between the output terminal 40 of an amplifier circuit (FIG. 3) and inverting input terminal 21 of comparator 20. Output terminal 42 of comparator 20 is connected to trigger input 46 of timer 44. A resistor network is connected to comparator 22 which substantially mirrors the network connected to comparator 20. Resistors 48 and 50 are connected in series between junction 25 of zener diodes 24 and 26 and the negative voltage terminal 15 of DC supply 16. The junction of resistors 48 and 50 is connected to the inverting input terminal 27 of comparator 22. Resistor 52 is connected between inverting input 27 of comparator 22 and ground 34 of the amplifier circuit shown in FIG. 2. Resistors 54 and 56 are connected in series to form a voltage divider between junction 25 and positive voltage terminal 17 of DC supply 16, with the junction of resistor 54 and 56 being tied to non-inverting input 23 of comparator 22. A resistor 58 is connected between positive output 40 of an amplifier circuit and non-inverting input 23 of comparator 22. Output 60 of comparator 22 is connected to trigger input 46 of monostable or one shot timer 44.

The resistor networks that interconnect comparators 20 and 22 to amplifier output 40 and positive and negative voltage terminals 17 and 15 of DC supply 16 have been chosen so as to make each comparator differentially receive the output voltage of the amplifier and the DC supply voltage. Resistors connected in a like fashion to each comparator will have an approximately equal value. Therefore, referring to FIG. 3 resistors 28, 35, 48 and 54 will have an equal or approximately equal value as will resistors 30, 36, 50 and 56 as will 32, 37, 52 and 58. Implementing equivalent resistance values allows comparators 20 and 22 to change output states at the same voltage ratio on alternative half cycles.

It should be noted that comparators 20 and 22 are paired components in a single integrated circuit chip and, therefore, share a common voltage supply between terminal 62 connected through resistor 29 to the positive voltage terminal 17 and input terminal 64 to negative voltage terminal 15 of DC supply 16.

The circuitry which provides support and proper biasing for monostable or one-shot timer 44 includes resistor 66 and capacitor 68 connected in series between junction 70 and negative voltage terminal 15 of DC supply 16. The junction of component 66 and 68 is connected to the threshold input terminal 72 and trigger input 46 of timer 44. A positive voltage is supplied to timer 44 by connecting pin 74 to positive voltage terminal 17 via resistor 29. Ground pin 76 is connected to the negative voltage terminal 15. Capacitor 78 is connected between input 80 of timer 44 and negative voltage terminal 15. Resistor 84 is connected between junction 70 and reset pin 82 of timer 44 with capacitor 86 and resistor 88 connected between reset pin 82 and negative terminal 15 to force a low voltage on output pin 92 upon initial power being supplied to the circuit until capacitor 86 fully charges. Supply by-pass capacitor 90 is connected between junction 70 and negative voltage terminal 15. Output pin 92 of timer 44 is connected by current limiting resistor 94 to gate 96 of field effect transistor 100 (hereinafter referred to as FET 100). Drain 104 of FET 100 is connected to positive voltage terminal 11 of DC supply 14 and to the anode of diode 110. The source lead 106 of FET 100 is connected to the cathode of diode 108 and to negative voltage terminal 15 of DC supply 16. The cathode of diode 110 is connected to positive voltage terminal 17 of DC supply 16. The anode of diode 108 is connected to negative voltage terminal 13 of DC supply 14.

The switching circuitry of this invention improves the efficiency of an amplifier power supply by switching DC supplies 14 and 16 from parallel to series arrangement in response to the amplifier exceeding a predetermined maximum output voltage. The predetermined maximum is a ratio of the amplifier voltage relative to the voltage across DC supply 16 and is determined by the supporting resistor networks connected to comparators 20 and 22 previously described. Initially, DC supplies 14 and 16 are connected in parallel, outputs 42 and 60 of comparators 20 and 22 are at a high voltage level and, therefore, do not trigger timer 44. Further, upon initialization capacitor 86 begins to charge thus placing a low voltage on output pin 92 and, thereby, maintaining FET 100 off and DC supplies 14 and 16 in parallel. Upon the output signal from the amplifier at terminal 40 exceeding the predetermined ratio even momentarily during the positive half cycle, comparator 20 will produce a low voltage level at output 42 thus triggering timer 44 to toggle its output at pin 92 from a low voltage to a high voltage level. In a like fashion, if the output of the amplifier monitored at pin 40 is greater than the predetermined ratio during the negative half cycle, comparator 22 produces a low output at pin 60 which also triggers timer 44 into toggling its output at pin 92 from a low voltage to a high voltage level. In this manner, if the amplifier output at pin 40 exceeds the predetermined ratio either in the positive or negative half cycle, timer 44 will be triggered.

When timer 44 triggers, a logical level high occurs at output pin 92 of timer 44 which causes FET 100 to turn on and create a current path which electrically places DC supply 14 and DC supply 16 in series. If the amplifier output signal at pin 40 is within normal limits i.e. lower than the predetermined ratio comparators 20 and 22 will not trigger timer 44 and, therefore, the output at pin 92 will be low which maintains FET 100 in the off condition. When FET 100 is off DC supplies 14 and 16 are connected in parallel through diodes 108 and 110 thus reducing the amount of power required to be dissipated by any one single supply. The stable state for timer 44 is to produce a low at output pin 92 and, therefore, FET 100 is normally off or nonconductive and DC supplies 14 and 16 are normally in parallel.

Monostable or one-shot timer 44 functions in switching circuit 18 to provide hysterisis to the switching of DC supplies 14 and 16. Timer 44 also sets the maximum frequency at which switching circuit 18 will switch DC supplies 14 and 16. Upon being initially triggered by either comparator 20 or 22, timer 44 will produce a high at pin 92 for a predetermined period of time. If a second or multiple trigger signals are received during the predetermined period of time that timer 44 is producing a high at output pin 92, timer 44 will retrigger and FET 100 will remain on. Therefore, the maximum frequency switchable is inversely proportionate to the predetermined period of time that timer 44 produces a high output at pin 92 in response to being triggered.

If hysterisis or a maximum switching frequency is not desired, timer 44 could be omitted and comparators 20 and 22 could be configured in a Schmidt trigger arrangement to adequately drive the switch transistor.

It is to be understood that the invention is not limited to the details above described but may be modified within the scope of the appended claims.

I claim:

1. In combination, a voltage amplifier having internal signals derived from an input signal and a power source to supply voltage to said amplifier, the improvement wherein said power source includes first and second voltage sources, a sensing means connected to said amplifier signals and voltages proportionate to the first voltage source for monitoring the differential voltage level between said amplifier signals and said first voltage source, a switch means for placing said first and second voltage sources in series upon said sensing means monitoring a minimum differential voltage level, said switch means for placing said first and second voltage sources in parallel upon said sensing means monitoring a differential voltage level greater than said minimum differential voltage level.

2. The combination of claim 1 wherein said drive means includes a timer connected to the output of said comparator means and being responsive to said sensing means to turn on said switch device for a predetermined period of time after being activated by said sensing means monitoring said minimum differential voltage level.

3. The combination of claim 1 wherein said amplifier signals is the amplifier output signal.

4. In combination, a voltage amplifier having internal signals derived from an input signal and a power source to supply voltage to said amplifier, the improvement wherein said power source includes first and second voltage sources, a sensing means connected to said amplifier signals and voltages proportionate to the first voltage source for monitoring the differential voltage level between said amplifier signals and said first voltage source, a switch means for placing said first and second voltage sources in series upon said sensing means monitoring a minimum differential voltage level, said switch means for placing said first and second voltage sources in parallel upon said sensing means monitoring a differential voltage level greater than said minimum differential voltage level, said sensing means includes comparator means for determining said differential voltage level between said amplifier signals and the voltage across said first voltage source.

5. The combination of claim 4 wherein said switch means includes a drive means for activating said switch means, said drive means includes a timer connected to the output of said comparator means and being responsive to said sensing means to turn on said switch device for a predetermined period of time after being activated by said sensing means monitoring said minimum differential voltage level.

6. The combination of claim 4 wherein said amplifier signals is the amplifier output signal.

7. In combination, a voltage amplifier having internal signals derived from an input signal and a power source to supply voltage to said amplifier, the improvement wherein said power source includes first and second voltage sources, a sensing means connected to said amplifier signals and voltages proportionate to the first voltage source for monitoring the differential voltage level between said amplifier signals and said first voltage source, a switch means for placing said first and second voltage sources in series upon said sensing means monitoring a minimum differential voltage level, said switch means for placing said first and second voltage sources in parallel upon said sensing means monitoring a differential voltage level greater than said minimum differential voltage level, said switch means includes a switch device and a driving means for activating said switch device, said switch device being connected between the positive voltage terminal of said first voltage source and the negative voltage terminal of said second voltage source, said driving means connected to said switch device for turning the switch device on and off.

8. The combination of claim 7 wherein said sensing means includes comparator means for determining said differential voltage level between said amplifier signals and the voltage across said first voltage source.

* * * * *